UNITED STATES PATENT OFFICE.

JOHN MARION STUKES, OF AUSTIN, TEXAS, ASSIGNOR TO TEXAS PURE FOOD COMPANY, A CORPORATION OF TEXAS.

FLAVORING COMPOUND.

No. 877,806.  Specification of Letters Patent.  Patented Jan. 28, 1908.

Application filed April 1, 1907. Serial No. 365,701.

*To all whom it may concern:*

Be it known that I, JOHN MARION STUKES, citizen of the United States, residing at Austin, in the county of Travis and State of Texas, have invented certain new and useful Improvements in Flavoring Compounds, and do hereby declare that the following is a full, clear, and exact description of the same.

The present invention has for its object to provide a flavoring compound especially adapted for flavoring meats and food products, soups, stews, etc., and consists in combining Mexican pepper, spices of cuminum and origanum, salt, garlic tallow or suet.

In preparing the compound substantially the following proportions of the above ingredients are considered as giving the most satisfactory results. Roasted powdered Mexican pepper, ten pounds. Roasted powdered cuminum spice, one and three quarter pounds. Roasted powdered origanum spice, one pound. Roasted powdered salt, six pounds. A sufficient amount of garlic tallow or suet is added to give the above compound the desired flavor and enable it to be formed into a compress.

The pepper, cuminum and origanum spices after having been roasted and ground into powder are thoroughly mixed and then take about eight pounds of beef suet cut finely and add three pounds of garlic pulp after which press out the pure "garlic tallow." While the garlic tallow is still in a melted condition add the mixture of pepper and spices and thoroughly mix together and when cold cut into pieces and grind in a suitable machine that will pass the compound out in stick form after which the sticks are cut the desired length and wrapped in oil paper and coveerd with tin foil to preserve the flavor and prevent evaporation.

If desired the compound may be in the form of tablets of any suitable and convenient size in place of the sticks as above described as I do not wish to be confined to any particular shape or size of the compressed mass, the garlic-suet forming both a flavoring and a body for holding the pepper and spices together.

The flavoring compound formed into a stick or tablet instead of being in liquid form renders it more convenient in using as well as more effectually preserving the flavor and strength when in a compressed form and as the several ingredients are thoroughly heated in compounding, all insect eggs that may be in any of the ingredients are destroyed in addition to preserving the compound by cooking or roasting.

An article of commerce is provided that will be convenient of use as a flavoring compound and can be placed upon the market without the expense of bottles or cans as if in liquid form.

Having now fully described my invention, what I claim as new and desire to secure by Letters Patent, is:—

1. A flavoring compound consisting of pepper, cuminum spice, origanum spice, salt, and garlic flavored suet formed into a compressed mass, in substantially the proportions herein described.

2. A flavoring stick or tablet consisting of pepper, cuminum spice, origanum spice, salt, and garlic flavored suet, in substantially the proportions specified compressed and wrapped in a moisture-excluding covering.

In testimony whereof I affix my signature in presence of two witnesses.

JOHN MARION STUKES.

Witnesses:
A. S. PHELPS,
O. DICKENS.